Nov. 29, 1955    R. E. ANDERSON    2,725,494
OSCILLATION-SUPPRESSED TACHOMETER INDICATOR
Filed Sept. 30, 1954
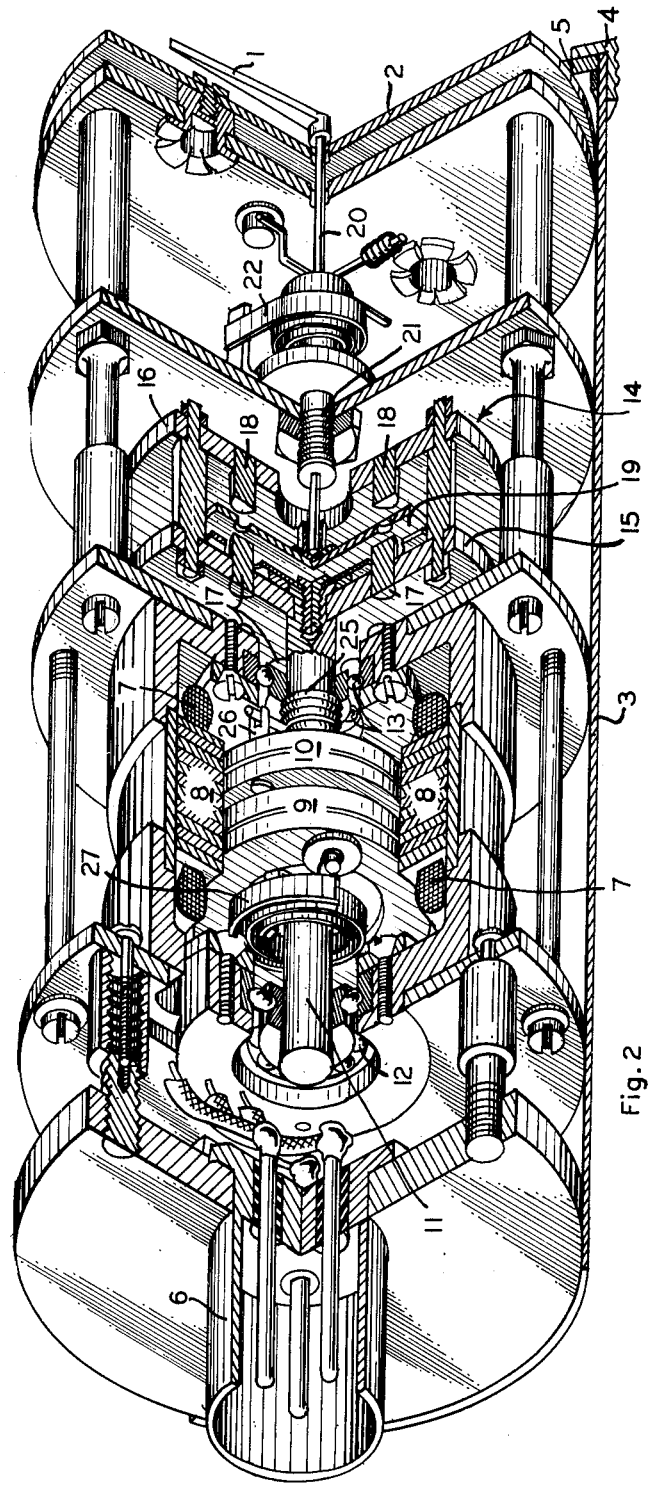
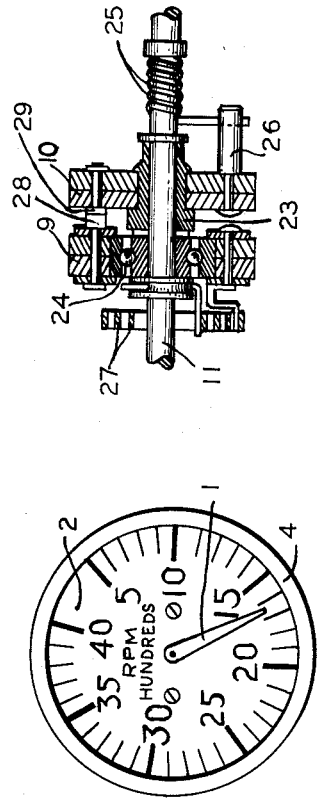
Inventor:
Richard E. Anderson
by, Richard E. Hosley
His Attorney

United States Patent Office 2,725,494
Patented Nov. 29, 1955

2,725,494

OSCILLATION-SUPPRESSED TACHOMETER INDICATOR

Richard E. Anderson, Lynn, Mass., assignor to General Electric Company, a corporation of New York Application September 30, 1954, Serial No. 459,419

6 Claims. (Cl. 310—126)

The present invention relates to improved tachometer indicators and, more particularly, to sensitive electrically-driven speed indicators in which pointer oscillations are suppressed and in which low starting-torques are realized.

One well known type of tachometer system for indicating speed of aircraft engines and the like employs a synchronous electrical generator, driven directly by the engine, and a remote synchronous motor in a panel-mounted indicator unit. For the purpose of deriving speed indications from the synchronous motor, a drag magnet assembly is attached to the motor shaft and an eddy-current drag disk is positioned in a suitable air gap in the drag magnet assembly. A spiral spring limits angular movement of the drag disk shaft, and a pointer or pointers coupled with the drag disk indicate the speed under measurement. Angular deflection of the pointer is found to be proportional to the speed because the torque produced in the drag disk is in proportion to speed of rotation of the drag magnet assembly.

A difficulty encountered with sensitive tachometer indicators of the foregoing type has been that sub-harmonic frequencies superimposed upon the fundamental frequencies in the system have been followed by the instrument pointers. This response results in highly disturbing pointer oscillations. Sub-harmonic frequencies which cause such oscillations are usually encountered when the tachometer generator is driven by a "rough" reciprocating engine or when there is torsional whip in a long helicopter rotor drive shaft, or when there is a loose fit between the generator drive shaft and mating parts. It is perceived, then, that the sub-harmonics are caused by certain erratic angular speeds being measured. Often the pointer oscillations are vastly amplified to wholly intolerable extents when the sub-harmonics match the natural periodicity of the tachometer drag-disk, shaft, spring and pointer assembly. Such regenerative effects may be mistaken for engine troubles, and must therefore be eliminated.

In accordance with teachings of the present invention, pointer oscillations of the foregoing type are rendered of negligible effect by unique rotor assemblies in the synchronous motors of the indicator units of tachometer systems. As is detailed later herein, the resulting improved tachometer indicators are of simple construction, do not require cumbersome or weighty damping structures, do not have heightened friction characteristics, and are not adversely affected in their times of response.

Accordingly, it is one object of this invention to provide simple improved tachometer indicators which avoid indicator oscillations while preserving low-friction and high response speed characteristics.

A further object is to provide novel tachometer indicators having synchronous motors which operate with low starting torques and which deliver outputs free of undesirable harmonic components.

By way of a summary account of one aspect of this invention, a tachometer indicator of the eddy-current drag disk type has a set of rotatable permanent magnets driven by a synchronous motor in which the rotor shaft mounts both a permanent magnet rotor and a rotor made of hysteresis material. Both of these motor rotors are rotatably positioned on the motor rotor shaft, the hysteresis rotor having a bearing mounting which has greater friction than the relatively sensitive bearing mounting for the permanent magnet rotor. The relative angular freedom between the motor rotor shaft and hysteresis rotor is restrained by a firm spring coupling between these two members, and the relative angular freedom between the rotor shaft and permanent magnet rotor is restrained by a relatively soft or sensitive spiral spring coupling. The further relative angular freedom between the hysteresis and permanent magnet rotors is limited by mechanical stops, such that either rotor may travel just under 360 degrees relative to the other before the stops will strike. As is explained later herein, the stop, bearing, and spring arrangements, and the proportioning of spring stiffnesses and bearing frictions, yield a synchronous motor output which actuates the indicating mechanism without inducing oscillations.

Although the features of this invention which are believed to be novel are set forth in the appended claims, greater detail of the invention in its preferred embodiments and the further objects and advantages thereof may be readily comprehended by reference to the following description taken in connection with the accompanying drawing, wherein:

Figure 1 depicts the front end dial arrangement for a tachometer indicator of the type in which the present invention is particularly advantageous;

Figure 2 displays a partly sectionalized perspective view of a tachometer indicator in which the teachings of this invention are embodied; and Figure 3 is a side view, partly sectioned, of the synchronous motor rotor assembly for the instrument shown in Figure 2.

In their measurement of engine speed aboard aircraft, electrical tachometer systems include an engine-mounted electrical generator and a remote panel-mounted tachometer indicator which is excited by the generator output signals. The front flange or dial portion of such indicators may be similar to that illustrated in Figure 1, wherein a pointer 1 travels across a suitably calibrated dial 2. Obvious requirements for such indicating instruments are that their pointers respond rapidly to the engine speeds being sensed, and that there be neither hunting nor excessive oscillation of the pointers if accurate indications are to be afforded. Further, it is important that the pointer respond to and accurately indicate speeds which may be very low, as when jet engines are being turnd over slowly during extremely critical starting intervals, and it is likewise important that the pointer be actuated properly when high starting speeds are encountered. Prior tachometer indicators often failed to start when low-intensity motor fields were experienced at low engine speeds, and such indicators also were erratic in operation or failed to reach synchronous speeds when sought to be started at high speeds. These difficulties are overcome and the above-mentioned requirements satisfied by the internal tachometer indicator apparatus represented in Figure 2.

The partly cut away view of an indicator appearing in Figure 2 reveals the indicator elements within its generally cylindrical casing 3, the mounting flange 4 and window glass 5 being provided at the front end at which the aforesaid dial 2 and pointer 1 are located. Through the rear connector 6, electrical signals from a suitable tachometer generator are brought through to the annular motor stator windings 7 inside casing 1, where rotating motor fluxes are created with the aid of the annular motor stator laminations 8. These rotating motor fluxes, which revolve at the same speed as the remote generator shaft, influence the staked-together permanent magnet rotor disks 9 and the staked-together hysteresis rotor disks 10 such that they tend to rotate at the same speed as the rotating stator flux field. Both sets of rotor disks are coupled with the motor rotor shaft 11, in a manner described later, and cause that shaft to rotate in its bearings 12 and 13 in synchronism with the remote generator speed. One end of the motor shaft 11 extends through bearing 13 and its locating bracket to support and rotate the drag magnet assembly 14. This magnet assembly includes two plates, 15 and 16, to which sets 17 and 18 of small permanent magnets are attached such that opposite poles of the small sets of magnets face each other across a narrow air gap. Positioned within the air gap is an eddy-current drag disk 19, of conductive material such as aluminum, which is supported there by the angularly movable pointer shaft 20. Under influence of the rotating field of the permanent magnets in the rotating magnet assembly 14, the drag disk 19 impresses a torque upon the pointer shaft 20, the torque being proportional to the speed of rotation of the magnet assembly, rotor shaft, motor field, and generator. However, the pointer shaft 20 is restrained from rotation in its sensitive bearing assembly 21 by a spiral spring 22, whereby the pointer 1 merely deflects angularly by amounts proportional to the aforementioned torque and speeds.

It has been found that the very rapid time-response characteristics of the synchronous motor, magnetic drag unit, and pointer mechanism, will enable the usual tachometer indicator pointer to follow erratic angular movements of the rotating member the speed of which is being sensed by the tachometer generator. Therefore, if the rotating member is, for example, a lengthy helicopter rotor shaft which twists with a periodic torsional whipping action, or if the rotating member is the output shaft of a reciprocating engine which is running roughly and has periodic angular accelerations and decelerations, the tachometer indicator pointer will oscillate rather than provide a steady indication. As was also pointed out earlier, if the periodicity of these erratic movements is harmonically related to the natural frequency of the indicator pointer assembly, the pointer oscillations commonly become regenerative and the sense of indications is wholly lost.

The synchronous motor arrangement illustrated in Figure 2 includes a rotor structure, further shown in Figure 3, which overcomes the aforesaid difficulties without the addition of undesirable frictions and inertias. The two sets of rotor disks, 9 and 10, are required to assure proper starting and operation at both high and low speeds. The purpose of the permanent-magnet material in disks 9 is to occasion starting and running torques at low speeds when the magnitude of the motor stator flux field is small. The hysteresis material of disks 10, on the other hand, provides the starting torque at high speeds when the flux field magnitude is great but where the permanent magnet disks 9 will not, by themselves, be pulled into synchronous rotation. At the higher speeds, the hysteresis disks move the rotor shaft nearly into synchronism with the stator field, and the permanent magnet rotor disks are then effective to pull the rotor shaft into substantially exact synchronism. Hysteresis material of which satisfactory hysteresis rotors can be made are well known in the motor art, and comprise materials experiencing high hysteresis losses, such as hardened steel. Chrome and cobalt steels are illustrative. Details of hysteresis motor construction and operation are described in "Standard Handbook for Electrical Engineers," edited by A. E. Knowlton, seventh edition, 1941, page 739, and in "Fractional Horsepower Electric Motors," by C. G. Veinott, second edition, 1948, pages 361–362. Hysteresis motor rotors operate at synchronous speed due to retentivity of the rotor hysteresis material.

One of the distinguishing features of the rotor structure is the bearing mounting arrangement for the two sets of rotor disks. Both the permanent magnet disks 9 and the hysteresis disks 10 are mounted on rotor shaft 11 such that they have freedom for relative angular motion, but a relatively high-friction sleeve bearing 23 mounts hysteresis disks 10 while a relatively sensitive low-friction bearing assembly 24 mounts permanent magnet disks 9. Therefore, as between these two sets of rotor disks, the hysteresis set should have the greater friction. The hysteresis rotor 10 is resiliently coupled with the rotor shaft 11 by the stiff helical spring 25 which is connected to shaft 11 at one end and to a suitable tab 26 on rotor 10 at the other end. A further distinctive feature of the rotor structure lies in the provision of a resilient coupling of the permanent magnet rotor 9 with shaft 11 by a spiral spring 27, or other suitable restraint, which is relatively "soft" or particularly resilient, as compared with the stiff helical spring 25. In addition, only limited relative angular movement is permitted between the rotors 9 and 10, this movement being just short of 360 degrees, as established by the cooperating stops 28 and 29 on rotors 9 and 10 respectively.

When a low-torque low-speed rotating field of the synchronous motor stator windings 7 seeks to cause rotation of rotor shaft 11 from rest, the permanent magnet rotor 9 responds immediately by beginning to rotate on its low-friction bearings 24. Because of this sensitive friction mounting, and because of the relatively low inertia of the permanent magnet rotor alone, that rotor almost immediately pulls into angular synchronism with the weak starting field. Only a relatively small angular movement of the rotor 9 is experienced before this lock-in occurs. The null or rest position of rotor 9, as determined by its weak coupling spring 27, is so fixed in relation to the null or rest position of the hysteresis rotor 10, as determined by its stiff spring 25, that the stops 28 and 29 on these rotors will not strike each other before the aforesaid condition of synchronism between the rotor 9 and a weak starting field is reached. Also, these null positions and the strength of spring 27 are selected such that, before the stops can strike, the spring 27 winds up and causes the rotor shaft 11 to turn with the permanent magnet rotor 9. When the rotor 9 has thus locked itself in synchronism with this starting field, of course, it can absorb the load of shaft 11 and the parts connected with that shaft, although initially the rotor 9 would never lock in synchronism with such a load imposed on it but would merely rock back and forth angularly on the shaft or remain stationary. The improved tachometer indicator will thus start to operate at low speeds, rather than vibrate or remain stopped. Once synchronous rotor rotation is realized, the spring 27 and bearings 24 for rotor 9 permit that rotor to deflect or oscillate angularly by certain amounts relative to the shaft 11. Therefore, when erratic generator shaft movements of the disadvantageous type earlier mentioned herein are experienced, the rotor 9 may follow them synchronously but yet impress only substantially uniform torques upon the rotor shaft 11. Spring 27 tends to dampen or absorb these erratic rotor movements, and they are not reflected upon the indicator pointer 1 and cannot cause regenerative oscillations of the pointer. The coupling spring 27 does more than dampen these undesired rotor movements, for it also provides the rotor 9 with enough angular freedom on its sensitive bearings such that it may follow the erratic field rotation without dropping out of synchronism, the latter occurrence being one which should be avoided.

Starting field torques are not always low, however, nor are these rotating field speeds at start always slow. Often, as where a tachometer indicator is turned on during high speed operation of an engine the speed of which is being measured, the torque of the tachometer indicator motor will be very high and the rotating field thereof will circulate at extremely high speed. Under these starting conditions, the permanent magnet rotor 9 is usually incapable of locking in synchronism with the stator field, and merely vibrates or remains stationary. However, the hysteresis rotor 10 functions very efficiently in such a field, and it immediately seeks to follow the field rotation, carrying the rotor shaft 11 and rotor 9 with it. Some small angular freedom of rotor 10 on shaft 11 is afforded by the sleeve bearing 23 and the relatively stiff coupling spring 25, whereby the hysteresis rotor 10 is able to begin rotation under influence of the motor field with only relatively small inertia. This arrangement facilitates and makes more certain the starting under high speed starting conditions. It is characteristic of hysteresis rotors that they lag the rotating fields occasioning their rotation, and, to obtain a more nearly exact synchronism between the rotating field and rotor shaft, the permanent magnet rotor 9 again assumes importance. It has been found that when the hysteresis rotor 10 has brought the shaft 11 into as close a synchronism with the rotating field as it is possible for it to do, the permanent magnet rotor 9 will then be following the field at positions so nearly in synchronism that it will leap into almost exact step with the field and remain locked with it. Through its coupling with shaft 11, rotor 9 also pulls the shaft 11 into substantial synchronism with the rotating field, and the tachometer indicator then operates with great accuracy.

Loss of synchronism between the rotating stator field and permanent magnet rotor 9 may occur occasionally, as when there is an extremely abrupt change in speed under measurement or when permanent magnet rotor oscillations become unduly large. When such loss of synchronization is experienced during high speed operation of the indicator, the permanent magnet rotor 9 tends to vibrate violently on shaft 11, leaping in one angular direction to attempt to overtake the rotating flux field and then reversing its angular direction to attempt to synchronize with the field which has earlier escaped it and is advancing toward it from the opposite direction. This phenomenon may occur even though the whole rotor structure is rotating under influence of the hysteresis rotor interaction with the field, and it evidences itself not only in inexact rotor speed but in undesirable vibrations or oscillations of the indicator pointer. It is in connection with this difficulty that the stops 28 and 29 on rotors 9 and 10 are of particular importance. When the aforesaid violent oscillations of the permanent magnet rotor 9 take place, the stops 28 and 29 will engage, whereupon the oscillations of rotor 9 are damped by the hysteresis rotor 10, shaft 11, and other elements coupled with shaft 11. The relatively high friction of sleeve bearing 23 between the shaft 11 and hysteresis rotor 10 is advantageous in that it aids the damping action. As a consequence of this stopping action, the permanent magnet rotor 9 is limited in its angular excursions and is quickly brought into synchronism with the rotating field by the motor actions described earlier.

It is possible to obtain beneficial operating effects with limit stops cooperating between the permanent magnet rotor 9 and shaft 11, rather than between that rotor and the hysteresis rotor 10, and relative freedom of about one revolution is advantageous in either arrangement. Resilient couplings and bearings of other constructions may also be employed, provided they present the characteristics noted for the specific preferred elements shown. Nor need the conductive drag member be of flat circular configuration, other types such as cup-shaped drag members being commonly used in tachometer structures.

Inasmuch as the specific embodiments of the invention disclosed herein are of a descriptive rather than a limiting nature, it will be apparent that modifications, combinations, or substitutions may be employed in accordance with these teachings without departing in spirit or scope from this invention in its broader aspects.

What I claim as new and desire to secure by Letters Patent of the United States is:

1. In a tachometer indicator having an angularly movable indicator actuated by an assembly of permanent magnet means and eddy-current conductor means, a rotor shaft for rotating one of said means, a motor stator for producing a rotating electromagnetic field, a first permanently magnetized rotor mounted on said shaft for relative angular movement in relation thereto and for interaction with said rotating field, a second rotor of hysteresis material mounted on said shaft for relative angular movement in relation thereto and for interaction with said rotating field, relatively stiff resilient means angularly coupling said second rotor with said shaft, and relatively yielding resilient means angularly coupling said first rotor with said shaft.

2. In a tachometer indicator having an angularly movable indicator actuated by an assembly of permanent magnet means and eddy-current conductor means, a rotor shaft for rotating one of said means, a motor stator for producing a rotating electromagnetic field, a first permanently magnetized rotor, low-friction bearing means mounting said first rotor on said shaft for relative angular movement in relation thereto and for motor interaction with said rotating field, a second rotor of hysteresis material, bearing means mounting said second rotor on said shaft for relative angular movement in relation thereto and for motor interaction with said rotating field, first resilient means angularly coupling said second rotor with said shaft, and second resilient means of resiliency substantially greater than that of said first resilient means angularly coupling said first rotor with said shaft.

3. In a tachometer indicator having an angularly movable indicator actuated by an assembly of permanent magnet means and eddy-current conductor means, a rotor shaft for rotating one of said means, a motor stator for producing a rotating electromagnetic field, a first permanently magnetized rotor, low-friction bearing means mounting said first rotor on said shaft for relative angular movement in relation thereto and for motor interaction with said rotating field, a second rotor of hysteresis material, bearing means having friction substantially greater than that of said low-friction bearing means and mounting said second rotor on said shaft for relative angular movement in relation thereto and for motor interaction with said rotating field, first resilient means angularly coupling said second rotor with said shaft, second resilient means of resiliency substantially greater than that of said first resilient means angularly coupling said first rotor with said shaft, and stop means cooperating with said first and second rotors to limit relative angular movement therebetween to less than 360 degress.

4. In a tachometer indicator having an angularly movable indicator actuated by an assembly having rotatable permanent magnet means and a resiliently-restrained angularly movable eddy-current drag member, a rotor shaft for rotating said permanent magnet means, a motor stator for producing an electromagnetic field rotating at speeds under measurement, a first permanently magnetized rotor, low-friction bearing means mounting said first rotor on said shaft for relative angular movement in relation thereto and for motor interaction with said rotor field, a second rotor of hysteresis material angularly coupled with said shaft for motor interaction with said stator field, and angularly resilient means angularly coupling said first rotor with said shaft and substantially isolating said shaft from torques due to oscillations of said first rotor.

5. In a tachometer indicator having an angularly movable indicator actuated by an assembly having rotatable permanent magnet means and a resiliently-restrained eddy-current drag member, a rotor shaft for rotating said permanent magnet means, a motor stator for producing an electromagnetic field rotating at speeds under measurement, a first permanently magnetized rotor, low-friction bearing means mounting said first rotor on said shaft for relative angular movement in relation thereto and for motor interaction with said stator field, a second rotor of hysteresis material angularly coupled with said shaft for motor interaction with said stator field, angularly resilient means angularly coupling said first rotor with said shaft and substantially isolating said shaft from torques due to oscillations of said first rotor, and stop means coupled with said first rotor and with said shaft to limit relative angular movement between said first rotor and said shaft to about one revolution.

6. In a tachometer indicator having an angularly movable indicator actuated by a spring restrained eddy-current drag member driven by rotatable permanent magnet means, a rotor shaft for rotating said permanent magnet means, a synchronous motor stator producing an electromagnetic field rotating at speeds under measurement, a first permanently magnetized rotor, low-friction bearing means mounting said first rotor on said shaft for relative angular movement in relation thereto and for motor interaction with said stator field, high-resiliency spiral spring means angularly coupling said first rotor with said shaft, a second rotor of hysteresis material, bearing means having friction substantially greater than that of said low-friction bearing means and mounting said second rotor on said shaft for relative angular motion in relation thereto and for motor interaction with said rotating field, spring means of stiffness substantially greater than said spiral spring means angularly coupling said second rotor with said shaft, and cooperating stop means on said first and second rotors limiting relative angular movement between said rotors to less than one revolution.

No references cited.